US008688853B2

(12) United States Patent
Clune et al.

(10) Patent No.: US 8,688,853 B2
(45) Date of Patent: Apr. 1, 2014

(54) METHOD AND APPARATUS FOR MAINTAINING MULTICAST LISTS IN A DATA NETWORK

(75) Inventors: David E. Clune, Califon, NJ (US); Hanan Z. Moller, Austin, TX (US); David P. Sonnier, Austin, TX (US)

(73) Assignee: Agere Systems LLC, Allentown, PA (US)

( * ) Notice: Subject to any disclaimer, the term of this patent is extended or adjusted under 35 U.S.C. 154(b) by 2287 days.

(21) Appl. No.: 10/037,067

(22) Filed: Dec. 21, 2001

(65) Prior Publication Data

US 2003/0120806 A1 Jun. 26, 2003

(51) Int. Cl.
G06F 15/16 (2006.01)
H04H 20/71 (2008.01)
H04L 12/28 (2006.01)

(52) U.S. Cl.
USPC ............................ 709/232; 370/312; 370/390

(58) Field of Classification Search
USPC .......... 709/238, 245, 232; 370/429, 432, 392, 370/312, 390
See application file for complete search history.

(56) References Cited

U.S. PATENT DOCUMENTS

| | | | | |
|---|---|---|---|---|
| 5,095,480 A * | 3/1992 | Fenner | ........................ | 370/238 |
| 5,295,262 A * | 3/1994 | Seigh, II | ................................ | 1/1 |
| 5,528,588 A * | 6/1996 | Bennett et al. | ................ | 370/396 |
| 5,577,246 A * | 11/1996 | Priddy et al. | ........................... | 1/1 |
| 5,875,189 A * | 2/1999 | Brownhill et al. | ......... | 370/395.7 |
| 5,924,098 A * | 7/1999 | Kluge | ................................. | 1/1 |
| 6,014,690 A * | 1/2000 | VanDoren et al. | ............ | 709/215 |
| 6,188,690 B1 * | 2/2001 | Holden et al. | ................. | 370/390 |
| 6,219,352 B1 * | 4/2001 | Bonomi et al. | ............... | 370/417 |
| 6,310,875 B1 | 10/2001 | Nichols et al. | | |
| 6,310,879 B2 * | 10/2001 | Zhou et al. | ..................... | 370/397 |
| 6,321,270 B1 | 11/2001 | Crawley | | |
| 6,327,621 B1 | 12/2001 | Lee et al. | | |
| 6,396,834 B1 * | 5/2002 | Bonomi et al. | ............... | 370/394 |
| 6,574,194 B1 * | 6/2003 | Sun et al. | ....................... | 370/235 |
| 6,581,063 B1 * | 6/2003 | Kirkman | ............................... | 1/1 |
| 6,661,789 B1 * | 12/2003 | Cankaya et al. | .............. | 370/390 |
| 6,762,995 B1 * | 7/2004 | Drummond-Murray et al. | .............................. | 370/229 |
| 6,822,958 B1 * | 11/2004 | Branth et al. | ................. | 370/390 |
| 7,075,928 B1 * | 7/2006 | Branth et al. | ................. | 370/390 |
| 7,730,220 B2 * | 6/2010 | Hasha et al. | .................. | 709/251 |
| 2001/0014096 A1 * | 8/2001 | Zhou et al. | ..................... | 370/395 |
| 2002/0021701 A1 * | 2/2002 | Lavian et al. | ................. | 370/401 |
| 2003/0088694 A1 * | 5/2003 | Patek et al. | .................... | 709/238 |
| 2012/0002546 A1 * | 1/2012 | Sundararaman et al. | ..... | 370/235 |

OTHER PUBLICATIONS

Knuth, Donald E. "The Art of Computer Programming", $2^{nd}$ Edition, vol. 1 "Fundamental Algorithms", 1973, pp. 228-231 and 270-273.*
Knuth, Donald E. "The Art of Computer Programming Volume 1/Fundamental Algorithms". 1997. Addison Wesley Longman. $3^{rd}$ Edition. pp. 1-45 (254-296).*

* cited by examiner

Primary Examiner — Imad Hussain
(74) Attorney, Agent, or Firm — Ryan, Mason & Lewis, LLP

(57) ABSTRACT

A multicast group list (i.e., destination node address list) for a network device is circularly linked such that the list can be entered at any point and traversed back to the entry point. The list traversal is then terminated as the entire list has been processed. The data packet received at the network device for transmission to the multicast group can indicate the entry point, although there are other techniques for determining the entry point. The destination node address for the entry point is skipped, that is the multicast data packet is not transmitted to the entry point destination address.

17 Claims, 4 Drawing Sheets

| A1 | | A1 | | A1 | | A1 |
|----|---|----|---|----|---|----|
| A2 | | A7 | | A6 | | A5 |
| A3 | | A2 | | A7 | | A6 |
| A4 | | A3 | | A2 | | A7 |
| A5 | | A4 | | A3 | | A1 |
| A6 | | A5 | | A4 | | A2 |
| A7 | | A6 | | A5 | | A3 |

| A1 | | A1 | | A1 | | A1 |
|----|---|----|---|----|---|----|
| A4 | | A3 | | A7 | | A7 |
| A5 | | A4 | | A6 | | A5 |
| A6 | | A25 | | A5 | | A4 |
| A7 | | A6 | | A4 | | A3 |
| A2 | | A7 | | A3 | | A2 |
| A3 | | A2 | | A2 | | A6 |

FIG. 2

METHOD AND APPARATUS FOR MAINTAINING MULTICAST LISTS IN A DATA NETWORK

FIELD OF THE INVENTION

This invention relates generally to a method and apparatus for multicast message transmissions to multiple nodes in a data network, and more specifically, to a method and apparatus for maintaining the list of recipients of a multicast message.

BACKGROUND OF THE INVENTION

The flow of data in a network is accomplished by transmitting data from one network node to another node until the data arrives at the destination node. Various data protocols are used for transmitting data in the network, including TCP/IP HTTP and UDP. The protocol selected for a data transfer is based on the type of network, the network topology, the data type and other factors.

Two different protocol classes are available for transmitting data through a network: unicast routing protocols and multicast routing protocols. Unicast routing protocols transmit data from a single source node to a single destination node, typically through several intermediate nodes. Although unicast protocols, such as TCP (transmission control protocol), can be used for multicasting, they are not efficient when applied to multicasting as the data is sent multiple times from the source node to each destination node in the multicast group.

Multicast routing protocols transmit data from one or more source nodes to multiple destination nodes, and are designed to be more efficient when sending data to a large number of nodes. The multiple destination nodes are defined as members of a multicast group such that each member of the group receives data addressed to the group. In multipoint-to-multipoint multicast, each receiving node in the group receives data from every sender. If the multicast group is limited to a single sender, this is referred to as point-to-multipoint multicast. Exemplary multicast groups can include the group of all nodes receiving a software update generated at the source node or an update to a node address list that is directed to a network device, such as a switch. Multi-participant videoconferences, distance learning (where a teacher communicates with geographically dispersed students) and multiple emails to a news group are also multicast data transmittals. In one exemplary multicast routing protocol, the sending node transmits data to each multicast group member through a single transmission to a multicast group address. An underlying multicast delivery mechanism delivers the data to all of the destination receivers who have registered to be a part of the multicast group. Known techniques such as multicast data flooding and reverse-path forwarding provide the mechanism by which the data is received by all routers in the network that lie on a path to a receiving node in the multicast group.

In one conventional router implementation, each network router stores a linear list of multicast group members (indexed according to the destination address or destination identifier (DID) of the group members) for those multicast groups in which a destination node connected to the router is a member. In certain applications, the router stores multicast group lists for all possible multicast sessions that might occur on the network, regardless of whether the a particular link from the router is actually participating in a multicast session.

The contents of each destination address entry in the multicast linear list include various nodal and protocol attributes of the destination address, i.e., data transmission parameters. Generally, the contents describe where (over which output port) and when (with what priority) to send the packet to the destination address and the nature of any transformations required in the packet header to ensure the packet reaches the destination address. For example, an entry can include a queue identifier indicating the router output port through which the data must be sent to reach the destination address. Another item in the entry identifies any packet header transformations that are required to satisfy the requirements of the communications medium and the network protocol of the destination address (which may be different than medium and protocol of the source node). A list entry can further include a descriptor of the shortest path from the router to the destination node. At a minimum, information is required for each entry to indicate which headers to prepend to the packet for transmission on each of the outgoing medium. The linear list does not include a link at each entry; rather the entries are arranged in sequence. The last list entry includes an indicator asserting that the end of the list has been reached.

For some applications, namely emulation of broadcast in a virtual local area network environment, a multicast group list is stored in multiple versions, where each stored list includes all members of the group, minus one. Since there is one omitted member from each list, the number of multiple lists for a group is equal to the number of entries in the list. Significant storage capacity is required at each router to store these multiple versions for only a single multicast group.

When a multicast packet arrives at a network router, the sending node and the intended multicast group are determined from the received packet. This information is then used to select the appropriate group list where the source node is the omitted node from the list. Thus the packet is transmitted to the group, but since the source node is not included within the group list, the packet is not transmitted back to the source.

In certain embodiments, the members of the group may be local area networks, each comprising a plurality of nodes, rather than individual network nodes. The source node, which is thus a network, transmits the packet to all nodes within its network and requests transmittal of the packet to a multicast group. In this situation, it is particularly advantageous to prohibit transmittal of the packet back to the source node, since the packet would then be resent to each node of the source network, unnecessarily consuming significant bandwidth within the source network.

Rather than omitting one network node from each group list, according to another multicast technique, each linear list begins with a different member of the group. See FIG. 1 where an "A" multicast group includes seven members, with their addresses indicated by the characters A1 through A7. Each "A" group list begins with a different group member. According to this embodiment, the multicast packet data received at the router includes certain header information from which a an optional skip first flag identifier is derived. The incoming packet is processed through a classification engine, for determining the incoming port and the destination identification from the packet header. Also, the header includes information from which the value (i.e., set or not set) of the skip first flag is determinable. For example, the address in the packet header can specify a multicast packet and the classification engine can be programmed to recognize this address and generate the correct destination addresses and the skip first flag value based thereon.

The router classifying engine then reads the address and flag information and selects the correct multicast group list by matching the source address with the first entry in a group list. If the skip first flag is set, the data is not sent to the first address in the group.

If there are N members in a multicast group, each serving as a source for a multicast packet, and the packet must be sent to all other members of the group, then N lists are required. But each list has (N−1) entries because the packet is not sent back to the source node. Thus (N)(N−1)memory locations are required to store all group lists, where each list includes all members of the group except one. Therefore, the storage requirements at each router can be considerable if N is relatively large, as it would typically be.

In another embodiment where the data is transmitted to the receiving nodes of the multicast group in a specific order, then additional group lists are required, with each group list setting forth a different order for the receiving nodes. See FIG. 2 where eight different ordered lists are illustrated, each having destination identifier "A1" at the top of the list. There are a total of 720 different ordered lists with "A1" as the first entry. Similarly, there 720 lists with "A2" as the first entry. Thus for a relatively small group list of seven members, there are 5040 different lists to be maintained. Since many such lists are maintained for many multicast groups at each router, the memory storage requirements can be extreme.

SUMMARY OF THE INVENTION

To reduce the memory storage requirements at each network processor, for example, a router, where a copy of the multicast group list is maintained, a multicast group list according to the present invention is linked in a circular structure and allows for any list entry to serve as the starting point for processing through the list. In one embodiment, the chosen starting point for the list is the source node of the multicast data and the data is not transmitted back to the source node. Each entry in the multicast group list is linked to another entry, forming a circularly linked list. The processing engine proceeds through the multicast link list to prepare the multicast packet for transmission to each member of the group. When the addressing mechanism returns to the starting point, the link list has been completely traversed and the process terminates.

BRIEF DESCRIPTION OF THE DRAWINGS

The present invention can be more easily understood and the further advantages and uses thereof more readily apparent, when considered in view of the description of the invention and the following figures in which:

FIGS. 1 and 2 illustrate a plurality of multicast link lists according to the prior art;

DETAILED DESCRIPTION OF THE INVENTION

Figure 1:
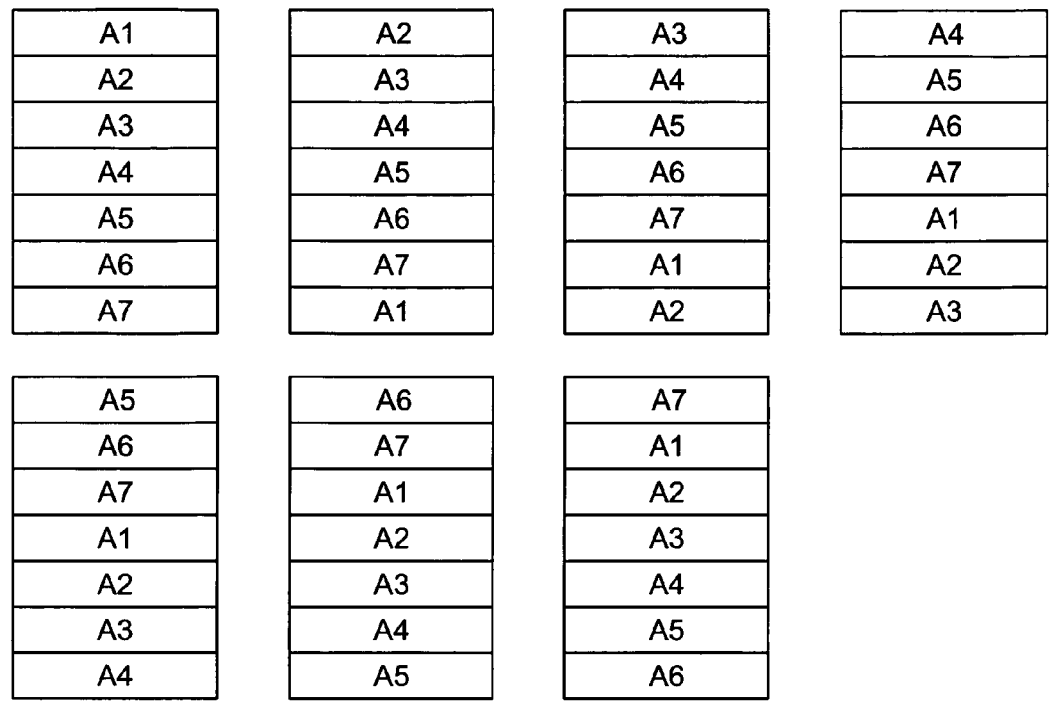
Figure 3:
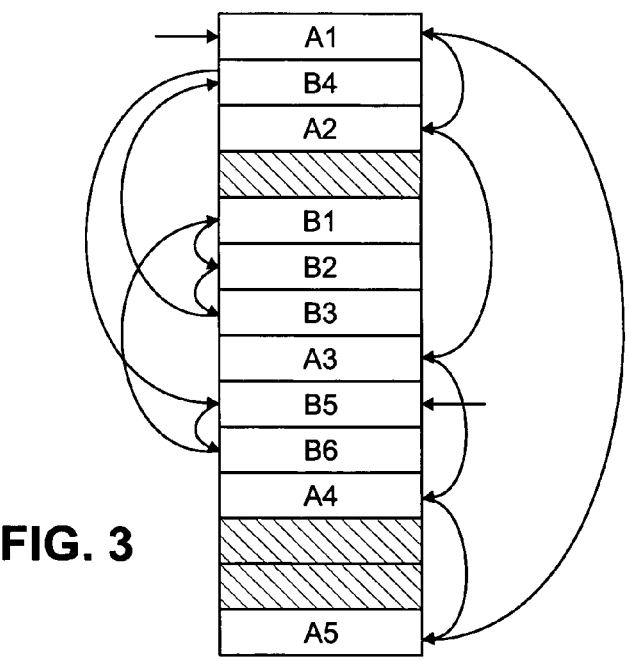
FIG. 3 illustrates a circular multicast list according to the present invention.

Two representative interleaved circular multicast group lists (A and B), according to the present invention, are illustrated in FIG. 3. The members of each group are circularly linked together, and it is therefore not necessary that the members appear in any specific order in the list. A packet arriving at a network processor for multicasting therefrom is stored in a multicasting staging queue. The head-end of the packet is loaded into a multicast thread for the linking operation. In one embodiment, the received packet identifies the entry point for initiating the processing of the multicast group list. The data packet also identifies the multicast group to which the packet is to be sent. Generally, each multicast packet includes an address that is preconfigured to represent a multicast group. As is known in the art, there are a number of schemes for accomplishing this according to the specific network requirements (e.g., an Internet protocol multicast is configured differently than an Ethernet multicast) and the router or other network processor is thus able to identify the packet as a multicast packet and further to identify the multicast group for which it is intended.

Each entry in the multicast list according to the present invention contains a pointer or linking information to another entry in the multicast group, and the last entry of the list points back to the entry point. In FIG. 3, the "A" list is entered at an entry point A1, and traverses through entries for the multicast destination nodes A2, A3, A4, A5 and then back to A1. As the processing engine reaches a list entry, the contents are processed (to determine the appropriate data transmission attributes of the packet, as discussed above, for successful transmission of the packet to the destination address) and a copy of the packet is created for that destination address, including the appropriate attributes associated with the destination address. Then the processing engine reads the entry's link information or pointer to determine the next entry for processing. This linking process continues until a pointer or link returns the processing engine back to the entry point, at which point the process terminates since the multicast group list has been completely traversed.

The exception to this process is the entry point, A1 in the example above. The entry point is skipped, i.e., the retransmission attributes for transmitting the packet to the entry point address stored there are not processed and a copy of the data packet is not created for the entry point address. Thus the multicast packet will not be transmitted to the entry point address. Instead, only the link information of the entry point is read so that the processing engine immediately proceeds to the next linked entry in the circular list.

There are several different techniques for identifying the entry point to the multicast list. As discussed above, in some applications it is not necessary, nor is it correct, to transmit the data packet back to the source node. Therefore, according to one embodiment of the present invention, the received data packet identifies the entry point and in this embodiment the source node is identified as the entry point. According to one embodiment, the header of the received data packet includes information from which the value of a skip flag is determined. If the skip flag has a predetermined value, then the source address is skipped during processing so that the data packet is not sent back to its source. Alternatively, the received data can identify another address as the entry point and therefore this address will be skipped and not receive the multicast data packet for this session. According to another embodiment, the received data packet indicates that it is a multicast or broadcast packet and the network router, in particular in applications such as a virtual local area network, is programmed to not retransmit the packet back to its source. In yet another embodiment, the entry point for the group list is determined external to the information contained in the data packet. For example, the device may be preprogrammed to always enter a specified multicast list at a predetermined entry point or the entry point may be determined based on the router input port on which the multicast packet was received.

As the process is executing, the first (i.e., the entry node) and the second processed node of the multicast group are saved in the multicast thread for use in determining when the process returns to the entry point. Whenever that node is reached for the second time, the process terminates.

The use of a circular multicast list according to the present invention significantly reduces the memory storage requirements at the network processor, as compared with the prior art. Only a single circularly linked list is required for each multicast group, with the entry point determining the group member to skip or omit from the group for this multicast session. In the prior art, each multicast group list is linearly linked and therefore must be replicated a number of times equal to the number of entries in the list, with each list replication omitting one group member, which does not receive a copy of the multicast packet.

Figure 4:
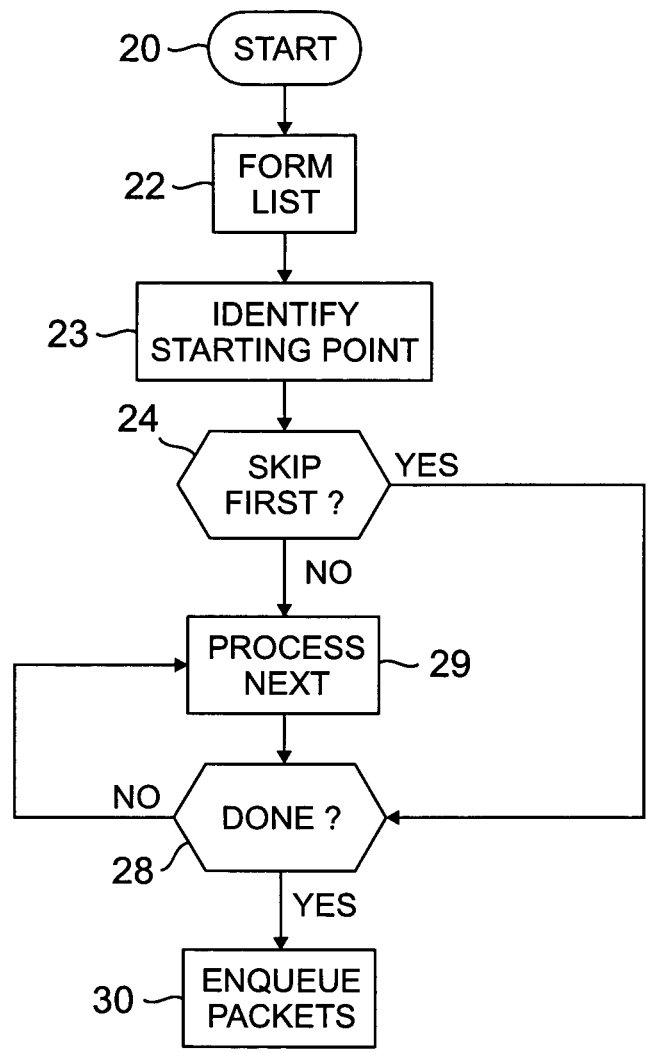
FIG. 4 is a flowchart illustrating processing steps according to the present invention.

FIG. 4 illustrates a flowchart for processing the circularly linked multicast group list according to the teachings of the present invention. The flowchart begins at a start step 20 and proceeds to a step 22 where the multicast group list is formed. Typically, these lists are formed in advance of the packet arrival, via a software configuration or protocol implemented by the network router, and updated as required to add or delete members. The destination address of each group member serves as the list index. At a step 23 the starting point for the list is identified by classifying the incoming packet to determine the multicast group list to which it should be sent. At a step 24 it is determined whether the starting point of the list should be skipped.

If the starting point is to be skipped, then the process moves to a decision step 28. If the starting point is not skipped, then the process continues to a step 29 where the data transmission parameters for the destination node of the list entry are determined and a copy of the multicast packet is prepared in accordance with those parameters. The process then continues to the decision step 28 to determine whether the list has been completely traversed and has returned to the starting point. If the list has not been traversed, the decision step 28 returns a negative response and the process returns to the step 29 for processing the next destination address. If the decision step 28 returns an affirmative answer, because the next entry is equal to the starting point or to a null next entry pointer then all destination addresses in the list have been processed and the multicast packets are enqueued for transmission at a step 30.

In another example shown in FIG. 3, the entry point for the link list "B" is address is B5, where B5 may represent the source node for the packet being processed. In any case, the B5 contents are not processed, but the link information is obtained. The process then executes through B6, B1, B2, B3, B4, processing the contents of each, and returns to B5. Upon return to B5, the complete list has been traversed, the data packets have been copied, the necessary packet modifications have been made as required by the characteristics of the destination node and the data packets are ready to be multicast to the destination nodes. That is, all nodes of the B multicast group list except the entry point destination address, B5.

As indicated in FIG. 3, there is no required order for the elements of a link list and several link lists can be interleaved. Note that in FIG. 3 the "A" and the "B" lists are interleaved and the individual destination addresses are not ordered. As the list is created and destinations added and deleted, new destinations can be added at any point, provided that the individual elements are linked from one to the other. The cross hatched blocks in FIG. 3 represent previously deleted address in the circular link list.

Figure 5:
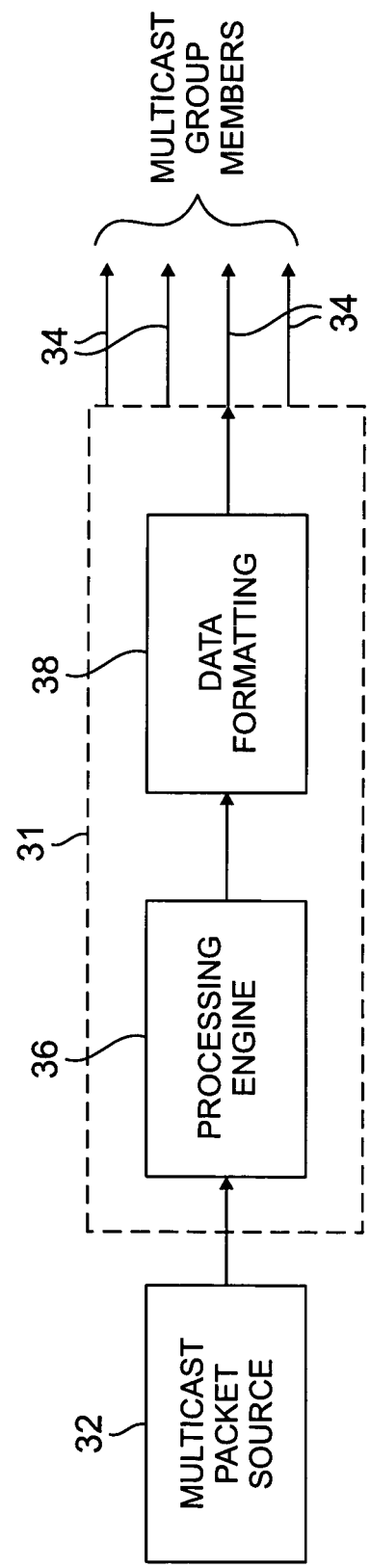
FIG. 5 illustrates a network processor including a circular multicast link list according to the teachings of the present invention.

FIG. 5 illustrates a network processor 31 constructed according to the teachings of the present invention, including a circular multicast group list as described above, such as the circular multicast group lists of FIG. 3. A multicast packet source 32 transmits a data packet for multicast to individual multicast group members 34 via the network processor 31. Upon receipt of the packet by the network processor 31, a processing engine 36 therein determines the entry point of the multicast list, according to the teachings of the present invention as described above, and traverses the list until returning back to the entry point. At each entry in the multicast list, a data formatter 38 formats a multicast data packet in accordance with the data transmission parameters set forth in the contents of list entry. The multicast packet, as modified to satisfy the data transmission parameters of each destination address, is transmitted to the multicast group members 34.

Destination addresses can be dynamically added and deleted from a multicast group list. Because these additions or deletions may occur while the list is active, i.e., in use to send data packets to the destination addresses, a process that does not interfere with the multicasting of the packets must be utilized. Assume that B5 is to be deleted from the "B" multicast list. First the pointer associated with B4 is modified to point to B6. Then the pointer from B5 to B6 is removed. Each multicast group has an associated thread of status bits, which are cleared whenever an entry in the group is added or deleted. The bits are set active when the group is traversed and thus provide an indicator that the group list has been successfully modified.

What is claimed is:

1. A method for transmitting multicast data to destination nodes of a given multicast session in a network having a plurality of nodes, comprising:

forming a circularly linked list comprising a plurality of entries corresponding to respective destination nodes for receiving multicast data, each entry of the circularly linked list comprising a link to another entry in the list corresponding to another destination node;

receiving the multicast data intended for transmittal to the destination nodes of the given multicast session;

entering the circularly linked list at an initial entry corresponding to an initial destination node;

traversing the circularly linked list using the links of respective entries of the circularly linked list until the initial entry is reached and, for each entry of the circularly linked list other than the initial entry, sending the multicast data to the corresponding destination node such that the initial destination node is excluded from the given multicast session; and dynamically modifying the circularly linked list without interrupting traversal of the circularly linked list, wherein modifying the circularly linked list comprises at least one of adding to and deleting from the plurality of entries in the circularly linked list;

wherein destination nodes for a plurality of multicast sessions are interleaved in the circularly linked list, and wherein the destination nodes for each one of the plurality of multicast sessions are circularly linked;

wherein entries in the circularly linked list corresponding to respective ones of the destination nodes in the given multicast session are associated with a thread of corresponding status bits;

wherein the status bits for entries in the circularly linked list corresponding to respective ones of the destination nodes in the given multicast session are set active during traversal of the circularly linked list; and wherein dynamically modifying the circularly linked list without interrupting traversal of the circularly linked list comprises clearing the status bits for entries in the circularly linked list which are added or removed.

2. The method of claim 1 wherein the received data includes an indicator identifying the destination node that is to be excluded from the given multicast session.

3. The method of claim 2 wherein the indicator identifies the destination node from which the data was received as the destination node to be excluded from the given multicast session.

4. The method of claim 1 wherein the initial destination node is predetermined.

5. The method of claim 1 further comprising receiving data intended for transmittal to the destination nodes of the given multicast session on an input port, and wherein the initial destination node is determined based on the input port.

6. The method of claim 1 wherein the initial destination node is the destination node from which the data was received such that the destination node from which the data was received is excluded from the given multicast session.

7. The method of claim 1 wherein each entry of the circularly linked list further comprises a destination address associated with the corresponding destination node, and wherein sending the multicast data to the corresponding destination node comprises sending the multicast data to the destination address associated with the corresponding destination node.

8. The method of claim 1 wherein each entry of the circularly linked list further comprises one or more data transmission parameters associated with the corresponding destination node, and wherein sending the multicast data to the corresponding destination node comprises sending the multicast data according to the one or more data transmission parameters associated with the corresponding destination node.

9. A method for transmitting multicast data to destination nodes for a given multicast session in a network having a plurality of nodes, comprising:
   forming a multicast group list comprising a queue further comprising a circularly linked list comprising a plurality of entries corresponding to respective destination nodes, wherein each entry of the circularly linked list includes a link to another entry in the list corresponding to another destination node;
   receiving the multicast data intended for transmittal to the destination nodes of the given multicast session;
   entering the circularly linked list at an initial entry corresponding to an initial destination node destination node;
   traversing the circularly linked list using the links of respective entries of the circularly linked list and, for each entry of the circularly linked list other than the initial entry, sending the multicast data to the corresponding destination node such that the initial destination node is excluded from the given multicast session; and
   dynamically modifying the circularly linked list without interrupting traversal of the circularly linked list, wherein modifying the circularly linked list comprises at least one of adding to and deleting from the plurality of entries in the circularly linked list;
   wherein destination nodes for a plurality of multicast sessions are interleaved in the circularly linked list, and wherein the destination nodes for each one of the plurality of multicast sessions are circularly linked;
   wherein entries in the circularly linked list corresponding to respective ones of the destination nodes in the given multicast session are associated with a thread of corresponding status bits;
   wherein the status bits for entries in the circularly linked list corresponding to respective ones of the destination nodes in the given multicast session are set active during traversal of the circularly linked list; and
   wherein dynamically modifying the circularly linked list without interrupting traversal of the circularly linked list comprises clearing the status bits for entries in the circularly linked list which are added or removed.

10. The method of claim 9 wherein the received data includes an indicator identifying the destination node that is to be excluded from the given multicast session.

11. The method of claim 10 wherein the indicator identifies the destination node from which the data was received as the destination node to be excluded from the given multicast session.

12. The method of claim 9 wherein the initial destination node is predetermined.

13. The method of claim 9 further comprising receiving data intended for transmittal to the destination nodes of the given multicast session on an input port, and wherein the initial destination node is determined based on the input port.

14. An apparatus for transmitting multicast data to destination nodes of a given multicast session in a network having a plurality of nodes, comprising:
   a memory operative to store a circularly linked list comprising a plurality of entries corresponding to respective destination nodes, each entry of the circularly linked list comprising a link to another entry in the list corresponding to another destination node; and
   a processor operative to perform the operations of:
      receiving multicast data intended for transmittal to the destination nodes of the given multicast session;
      entering the circularly linked list at an initial entry corresponding to an initial destination node;
      traversing the circular linked list using the links of respective entries of the circularly linked list until the initial entry is reached, and for each entry of the circularly linked list other than the initial entry, sending the multicast data to the corresponding destination node such that the initial destination node is excluded from the given multicast session; and
      dynamically modifying the circularly linked list without interrupting traversal of the circularly linked list, wherein modifying the circularly linked list comprises at least one of adding to and deleting from the plurality of entries in the circularly linked list
   wherein destination nodes for a plurality of multicast sessions are interleaved in the circularly linked list, and wherein the destination nodes for each one of the plurality of multicast sessions are circularly linked;
   wherein entries in the circularly linked list corresponding to respective ones of the destination nodes in the given multicast session are associated with a thread of corresponding status bits;
   wherein the status bits for entries in the circularly linked list corresponding to respective ones of the destination nodes in the given multicast session are set active during traversal of the circularly linked list; and
   wherein dynamically modifying the circularly linked list without interrupting traversal of the circularly linked list comprises clearing the status bits for entries in the circularly linked list which are added or removed.

15. The apparatus of claim 14 further comprising receiving data intended for transmittal to the destination nodes of the given multicast session on an input port, and wherein the initial destination node is determined based on the input port.

16. The apparatus of claim 14 wherein each entry of the circularly linked list further comprises a destination address associated with the corresponding destination node, and wherein sending the multicast data to the corresponding destination node comprises sending the multicast data to the destination address associated with the corresponding destination node.

17. The apparatus of claim 14 wherein each entry of the circularly linked list further comprises one or more data transmission parameters associated with the corresponding destination node, and wherein sending the multicast data to the corresponding destination node comprises sending the multicast data according to the one or more data transmission parameters associated with the corresponding destination node.

* * * * *